United States Patent Office 3,530,166
Patented Sept. 22, 1970

3,530,166
1,3,4,10-DECANETETRACARBOXYLIC ACID AND ESTERS THEREOF
Neville Finch, Irvington, and William Irving Taylor, Summit, N.J., assignors to Ciba Corporation, New York, N.Y., a corporation of Delaware
No Drawing. Filed Feb. 10, 1966, Ser. No. 526,379
Int. Cl. C07c 55/24, 69/34
U.S. Cl. 260—485           2 Claims

ABSTRACT OF THE DISCLOSURE

A compound of the formula

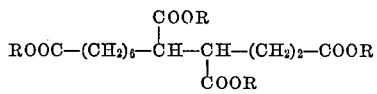

in which R is selected from the group consisting of hydrogen, lower alkyl and aralkyl. The compounds are useful as intermediates in the preparation of pharmacologically active compounds.

---

The present invention concerns and has for its object the provision of the 2-(6-carboxy-hexyl)-3-oxo-1-cyclopentenecarboxylic acid having the Formula I

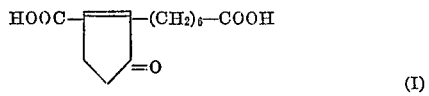

its carbonyl derivatives, the esters and salts of these compounds, as well as methods for their preparation.

Carbonyl derivatives are preferably those containing at least one nitrogen atom, such as imines, especially aliphatic imines in which the aliphatic moiety stands above all for lower alkyl, e.g. methyl, ethyl, n- or i-propyl, n-, i-, sec. or tert.-butyl, but also for lower alkenyl, e.g. allyl or methallyl, cycloalkyl or cycloalkyl-lower alkyl containing preferably 5 to 6 ring-carbon atoms, e.g. cyclopropyl, cyclopentyl, cyclohexyl, cycloheptyl, cyclopentylmethyl, cyclohexylmethyl, 1- or 2-cyclopentylethyl or 1-, 2- or 3-cyclohexyl-propyl, furthermore oximes, O-lower alkyl-oximes, hydrazones, mono- or di-lower alkylhydrazones, semicarbazones or thiosemicarbazones, enolesters or -ethers, such as those derived from lower alkanoic acids, e.g. acetic, propionic or butyric acid, or lower alkanols or aralkanols respectively, e.g. those mentioned below.

The esters are preferably the diesters derived, for example, from lower alkanols or aralkanols, such as methanol, ethanol, n- or i-propanol, n-, i-, sec. or tert. butanol, n-pentanol, n-hexanol or n-heptanol, benzyl alcohol, 1- or 2-phenyl-ethanol.

Salts of the above acid or its derivatives are preferably alkali or alkaline earth metal salts, e.g. sodium, potassium, magnesium or calcium salts or ammonium salts derived from ammonia or amines, preferably aliphatic amines, such as mono-, di- or tri-lower alkylamines, e.g. methylamine, ethylamine, diethylamine or triethylamine.

The compounds of the invention exhibit valuable pharmacological properties. Apart from adrenolytic effects, they enhance the estrogens and show primarily antiandrogenic effects, as can be demonstrated in animal tests using, for example, rats or dogs as test objects. They are, therefore, useful antiandrogens, for example, in the management of premature virilisation, as antifertility agents or as adjuvants in the management of hypertension. Furthermore, they can be used as intermediates for the preparation of other useful products, preferably of pharmacologically active compounds.

Particularly useful derivatives of the acid of Formula I are its semicarbazone and thiosemicarbazone as well as the lower alkyl ester of these compounds.

The compounds of the invention are prepared by methods in themselves known. For example, the process for their preparation consists in dehydrohalogenating a halogen adduct of the 2-(6-carboxy-hexyl)-3-oxo-cyclopentanecarboxylic acid, an ester, enol ester or enol ether thereof and, if desired, converting a resulting compound into another compound of the invention.

The halogen adduct used in the above process is advantageously that obtained from bromine and a di-lower alkyl ester of the 2-(6-carboxy-hexyl)-3-oxo-cyclopentanecarboxylic acid or an enolester thereof derived, for example, from a lower alkanoic acid. The dehydrohalogenation is carried out, for example, with the use of organic bases, e.g. tertiary nitrogen bases, such as tri-lower alkylamines or pyridines, e.g. triethylamine or lutidine.

Any resulting ester may be hydrolyzed, for example, with the use of the inorganic bases, such as aqueous solutions of alkali metal hydroxides, carbonates or bicarbonates, or transesterified, advantageously in the presence of small amounts of acids. The acid obtained or a carbonyl derivatives thereof may be esterified in the usual manner, for example, with alcohols in the presence of acids, with reactive esters or diazo-compounds, or salified with any suitable base or ion exchanger. Any salt obtained may be converted into the free acid or another salt according to known methods. Any resulting 3-oxo-compound may be reacted with primary amines, hydroxylamines, hydrazines, semicarbazides, thiosemicarbazides, acid anhydrides, halides or esters; alkali metal enolates or oximes thereof with reactive esters of alcohols e.g. the hydrohalic or sulfonic acid esters thereof, and the like.

The above mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The starting material used as well as the intermediates in its synthesis, i.e. the compounds of the Formulae II to VII shown below, are new and are intended to be included within the scope of the invention. They are prepared according to the following formula scheme:

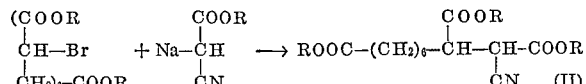

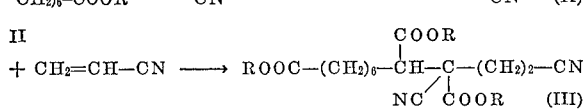

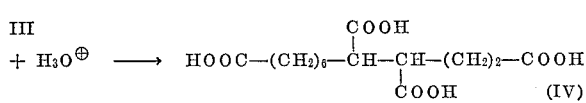

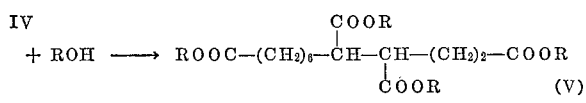

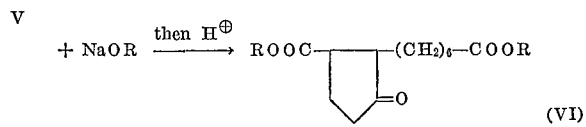

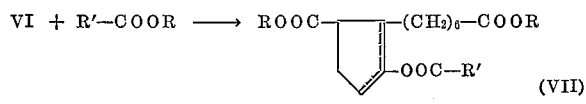

R and R′=lower alkyl or aralkyl. This synthesis is illustrated in more detail in the following examples.

The invention further includes any variant of the above processes, in which an intermediate product obtainable at any stage thereof is used as starting material and any remaining steps are carried out, or the synthesis is discontinued at any stage thereof, or in which a starting material or intermediate respectively is formed under the reaction conditions, or in which a reaction component is used in the form of a salt or another derivative.

Compounds of the invention that are mixtures of isomers may be separated into simple isomers by methods in themselves known. For example, compounds that contain one or more asymmetrical carbon atoms may be in the form of racemate mixtures, pure or optical antipodes. Mixtures of racemates can be resolved into pure racemates by virtue of the physicochemical differences between the components, for example, by chromatography and/or fractional crystallization. Racemic products can be resolved into optical antipodes, for example, by reaction with compounds containing no center of symmetry, separation of the diastereomeric products, such as salts or esters, and liberation of the optical active products.

The pharmacologically active compounds of the invention can be used, for example, for the manufacture of pharmaceutical compositions containing them in conjunction or admixture with inorganic or organic, solid or liquid pharmaceutical excipients, suitable for enteral, parenteral or topical administration. Suitable excipients are substances that do not react with said compounds of the invention, for example water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions, which are prepared by conventional methods, are also intended to be included within the scope of the present invention.

The following examples illustrate the invention, temperatures are given in centrigrade, UV-data are obtained from methanolic solutions and all parts wherever given are parts by weight.

EXAMPLE 1

48 g. of the enol acetate of 2-(6-ethoxycarbonyl-hexyl)-3-oxo-cyclopentanecarboxylic acid ethyl ester are dissolved in 100 ml. dry carbon tetrachloride, the solution is cooled to −5° and 20.6 g. bromine in 100 ml. dry carbon tetrachloride are added dropwise during one hour while stirring, and stirring is continued for ½ hour after addition. Hereupon 13.2 g. triethylamine are added, the mixture is refluxed for 2 hours and allowed to stand at room temperature overnight. The precipitate formed is removed by filtration, the filtrate evaporated in vacuo, the residue distilled and the fraction boiling at 153–154°/0.1 mm. Hg collected. It represents the 2-(6-ethoxycarbonyl-hexyl)-3-oxo-1-cyclopentenecarboxylic acid ethyl ester of the formula

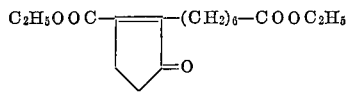

The semicarbazone thereof melts at 87–88°; U.V.—absorption: $\lambda_{max.}$=298 m$\mu$, I.R.-absorption:

$\nu_{max.}^{CHCl_3}$=3510, 3370, 1720, 1690 and 1560 cm.$^{-1}$

The starting material is prepared as follows:

375 g. diethyl α-bromo-azelate are slowly added to the stirred solution of the sodium enolate, prepared from 28.5 g. sodium hydride and 131 g. ethyl cyanoacetate in 150 ml. glycol dimethyl ether. The mixture is refluxed overnight, then the solvent is removed under reduced pressure, the residue acidified with diluted hydrochloric acid, extracted with diethyl ether, the extract dried and evaporated. The residue is distilled and the fraction boiling at 190–205°/0.7 mm. Hg collected; it represents the triethyl α-cyano-β-carboxy-sebacate of the formula

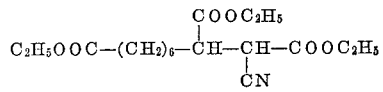

$\lambda_{max.}$=2225 and 1735 cm.$^{-1}$.

0.2 g. sodium are reacted with 150 ml. dry ethanol and to the solution first 224 g. triethyl α-cyano-β-carboxy-sebacate and then 34.5 g. acrylonitrile are added slowly with stirring and the mixture is allowed to stand overnight at room temperature. It is then acidified with hydrochloric acid, evaporated in vacuo and the residue, containing the 1,3-dicyano-3,4,10-decanetricarboxylic acid triethyl ester of the formula

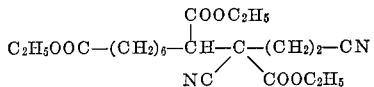

which is used without further purification; B.P. 181–183°/0.1 mm. Hg, $\lambda_{max.}$=2250 and 1735 cm.$^{-1}$.

The whole amount thereof is refluxed in 1.4 liter concentrated hydrochloric acid for 24 hours, using an air condenser to permit the evaporation of the ethanol formed. The mixture is then evaporated, the residue triturated with diethyl ether and recrystallized from ethyl acetate to yield the 1,3,4,10-decanetetracarboxylic acid of the formula

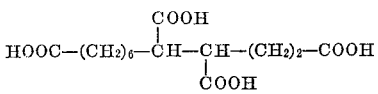

melting at 143–145°.

The mixture of 227 g. thereof, 1 liter ethanol-benzene (3:5) and 5 ml. concentrated sulfuric acid is refluxed on a water trap overnight. Hereupon the solution is concentrated, the residue taken up in diethyl ether, the extract washed with 10% aqueous potassium carbonate, dried and evaporated. The residue is distilled and the fraction boiling at 192/0.13 mm. Hg collected; it represents the 1,3,4,10-decanetetracarboxylic acid tetraethyl ester of the formula

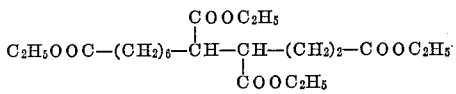

The solution of 225 g. thereof in 200 ml. dry diethyl ether is added slowly to a stirred mixture of 16 g. sodium hydride, 3 ml. ethanol and 200 ml. dry diethyl ether and the whole is stirred overnight at room temperature and for 2 additional days. Hereupon the mixture is acidified with diluted hydrochloric acid, washed with water, dried and evaporated. The residue is refluxed in diluted hydrochloric acid overnight. The mixture is then extracted with diethyl ether, the extract dried and evaporated. The residue is reesterified by refluxing it in 1 liter ethanol-benzene (3:5) and 5 ml. concentrated sulfuric acid with a water trap. The mixture is concentrated in vacuo, the residue taken up in diethyl ether, the extract washed with 10% aqueous potassium carbonate, dried and evaporated. The residue is distilled and the fraction boiling at 160–164°/0.1 mm. Hg collected; it represents the 2-(6-ethoxycarbonyl - hexyl) - 3 - oxo-cyclopentanecarboxylic acid ethyl ester of the formula

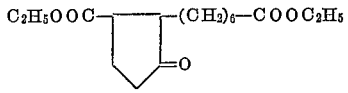

The semicarbazone thereof melts at 117°, I.R.-absorption:

$\nu_{max.}^{CHCl_3} = 3515, 3380, 1735, 1690$ and $1560$ cm.$^{-1}$

The mixture of 95.5 g. thereof and 61.2 g. isopropenyl acetate is refluxed overnight in the presence of 1.0 g. p-toluene sulfonic acid. The cooled mixture is washed with 10% aqueous potassium bicarbonate, dried and evaporated. The residue is distilled and the fraction boiling at 168–175°/0.1 mm. Hg collected. It represents the corresponding enol acetate.

EXAMPLE 2

2.27 g. 2 - (6-ethoxycarbonyl-hexyl)-3-oxo-1-cyclopentene-carboxylic acid ethyl ester are dissolved in 25 ml. methanol and 25 ml. 10% aqueous potassium carbonate are added. The mixture is refluxed for 1½ hours, cooled and extracted with diethyl ether. The aqueous solution is cooled in an ice bath, acidified with concentrated hydrochloric acid and extracted with diethyl ether. The extract is dried, evaporated and the residue recrystallized from benzene to yield the 2-(6-carboxy-hexyl)-3-oxo-1-cyclopentenecarboxylic acid of the formula

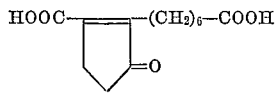

which melts after recrystallization from water at 95–96°.

EXAMPLE 3

5 g. 2 - (6 - ethoxycarbonyl-hexyl)-3-oxo-cyclopentane-carboxylic acid ethyl ester are dissolved in 5 ml. glacial acetic acid and to the stirred solution, 9.3 ml. of a 1.91 molar solution of bromine in acetic acid are added slowly. After completed addition the mixture is stirred for 15 minutes, then poured into a 10% aqueous potassium bicarbonate solution, which is extracted with diethyl ether. The extract is dried, evaporated, the residue is dissolved in 40 ml. dry carbon tetrachloride containing 2.5 ml. triethylamine, refluxed for 1½ hours, and allowed to stand at room temperature overnight. The mixture is filtered, the filtrate evaporated, the residue distilled and the fraction boiling at 165–172°/0.3 mm. Hg collected. It represents the 2 - (6 - ethoxycarbonyl-hexyl)-3-oxo-1-cyclopentenecarboxylic acid ethyl ester, which is identical with that obtained according to Example 1.

What is claimed is:
1. A compound of the formula

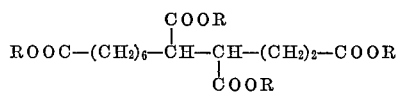

in which R stands for a member selected from the group consisting of hydrogen, lower alkyl and aralkyl.

2. A compound as claimed in claim 1 and being a member selected from the group consisting of the 1,3,4,10-decanetetracarboxylic acid and its tetraethyl ester.

References Cited

Zaputryaev et al., Chem. Abstracts, 52, p. 6,207 (1958).
Gelin et al., Bull Soc. Chim. France, 1965(1), pp. 139–143 (1965).
Chem. Abstracts, 62, 11681 (1965) citing Teichmann.

LORRAINE A. WEINBERGER, Primary Examiner
E. J. SKELLY, Assistant Examiner

U.S. Cl. X.R.

260—465.4, 468, 488, 501.1, 514, 537, 999